United States Patent
Callanan et al.

(10) Patent No.: US 10,358,594 B2
(45) Date of Patent: Jul. 23, 2019

(54) BORATE CROSSLINKER

(71) Applicant: PfP Technology, LLC, Katy, TX (US)

(72) Inventors: Michael J. Callanan, Houston, TX (US); Nathalie Rasolomiarantsoa, Houston, TX (US); Asoke Deysarkar, Houston, TX (US); Nikhil Patel, Houston, TX (US)

(*) Notice: Subject to any disclaimer, the term of this patent is extended or adjusted under 35 U.S.C. 154(b) by 122 days.

(21) Appl. No.: 15/175,297

(22) Filed: Jun. 7, 2016

(65) Prior Publication Data
US 2017/0349816 A1 Dec. 7, 2017

(51) Int. Cl.
| | |
|---|---|
| *C09K 8/68* | (2006.01) |
| *C09K 8/88* | (2006.01) |
| *C09K 5/00* | (2006.01) |
| *C08K 3/38* | (2006.01) |
| *C08K 5/053* | (2006.01) |
| *C09K 8/90* | (2006.01) |
| *C08K 5/09* | (2006.01) |

(52) U.S. Cl.
CPC .............. *C09K 8/685* (2013.01); *C09K 8/887* (2013.01); *C09K 8/90* (2013.01)

(58) Field of Classification Search
None
See application file for complete search history.

(56) References Cited

U.S. PATENT DOCUMENTS

| | | | |
|---|---|---|---|
| 6,024,170 A * | 2/2000 | McCabe | C09K 8/206 166/300 |
| 6,844,296 B2 | 1/2005 | Dawson et al. | |
| 6,936,575 B2 | 8/2005 | Dobson, Jr. et al. | |
| 7,018,956 B2 | 3/2006 | Dobson, Jr. et al. | |
| 7,325,608 B2 | 2/2008 | Van Batenburg et al. | |
| 7,497,263 B2 | 3/2009 | Parris et al. | |
| 8,450,248 B2 | 5/2013 | Horton | |
| 9,090,812 B2 | 7/2015 | Gerrard et al. | |
| 2007/0114035 A1* | 5/2007 | Parris | C09K 8/68 166/300 |
| 2010/0048429 A1* | 2/2010 | Dobson, Jr. | E21B 43/25 507/212 |
| 2012/0220503 A1 | 8/2012 | Reyes et al. | |
| 2012/0283148 A1 | 11/2012 | Dobson, Jr. | |
| 2013/0213657 A1 | 8/2013 | Dobson, Jr. et al. | |
| 2014/0262296 A1 | 9/2014 | Dobson, Jr. et al. | |
| 2014/0305650 A1 | 10/2014 | Song et al. | |
| 2014/0349897 A1 | 11/2014 | Dobson, Jr. et al. | |
| 2015/0048007 A1 | 2/2015 | Weerasooriya et al. | |
| 2016/0326426 A1* | 11/2016 | Rahy | C09K 8/685 |
| 2017/0190956 A1* | 7/2017 | Beach | C09K 8/685 |

* cited by examiner

*Primary Examiner* — Jeffrey D Washville
(74) *Attorney, Agent, or Firm* — Robert W. Strozier

(57) ABSTRACT

The present disclosure relates to a crosslinking composition for use in crosslinking an aqueous suspension of guar, for use as a well treatment fluid and/or proppant carrier fluid for natural gas extraction. The present crosslinking composition is an aqueous suspension of hydroboracite. The composition may also comprise varying amounts of borax, canola oil, xanthan, glycerol, and/or NaOH. The composition may be selected to effect a desired delay in the crosslinking reaction in order to customize the viscosity and reaction time to the method of use, thereby maximizing proppant delivery while minimizing pump pressure.

22 Claims, No Drawings

BORATE CROSSLINKER

BACKGROUND

Hydraulic fracturing (also called hydrofracturing, hydrofracking, fracking or fraccing) is a well-stimulation technique in which rock is fractured by a pressurized liquid. The process involves the high-pressure injection of fracking fluid (such as water containing proppants suspended with the aid of thickening agents) into a wellbore to create cracks in the deep-rock formations through which natural gas, petroleum, and brine will flow more freely. When the hydraulic pressure is removed from the well, proppants hold the fractures open.

Proppants are solid materials in the form of small grains, such as sand or ceramic particulates, that are introduced into fracking formations in order to prevent small fractures in the earth from collapsing during or following a fracturing treatment. Proppants are often delivered to fractures using carrier fluids. Higher viscosity carrier fluids carry proppants more effectively, but that viscosity also creates friction pressure within the pumps that pump the carrier fluid into the formation.

Guar is a botanically sourced substance that is commonly used as a thickening agent in proppant carrier fluids. Also called guaran or guar gum, guar is a galactomannan made from the ground endosperm of guar beans. Crosslinking hydrated guar suspensions, or suspensions of various guar derivatives, can create a gel fluid with relatively high viscosity. Higher viscosity fluids can carry higher concentrations of proppant, thereby enhancing the proppant delivery effectiveness of the system and enabling increased fracture width. Higher viscosity fluids also result in reduced fluid loss, which assists in increasing fracture length.

SUMMARY

The presently disclosed composition comprises a crosslinking agent that is useful in crosslinking guar proppant carrier fluids. Crosslinked proppant carrier fluids that contain the presently disclosed composition are well suited for mixture on the fly and are useful in delivering proppant to a wellbore shortly after the crosslinking agent and the guar proppant fluid are mixed. The presently disclosed crosslinking composition is an aqueous suspension that contains a balance between hydroboracite and borax that can be optimized for the timing of a particular mixing and well delivery system. In one preferred embodiment, the balance between hydroboracite and borax consists of approximately equal parts hydroboracite and borax. The presently disclosed composition preferably further comprises a lightweight oil such as canola oil, a thickening or stabilizing agent such as xanthan or a similar rheology modifier, and a polyol such as glycerol (also called glycerine or glycerin). Alternately, the crosslinking composition can comprise NaOH (also called lye or caustic soda) or similar alkali for pH regulation.

A preferred embodiment of the presently disclosed crosslinking comprises an aqueous suspension of approximately 10-20% hydroboracite, 1-12% borax, 0.15-0.18% xanthan, and 15-20% glycerol. An alternative embodiment further comprises 0.10-0.15% canola oil. A further preferred embodiment comprises approximately 10-12% hydroboracite and 10-12% borax. In general, as the balance between hydroboracite and borax favors hydroboracite, the rate at which the composition crosslinks guar will decrease. Likewise, as the balance favors borax, the rate at which the composition crosslinks guar or HPG will increase. The composition can be balanced to accommodate instant crosslinking, or crosslinking of any desired delay.

The presently disclosed composition is suited for crosslinking guar-based proppant carrier fluids. One crosslinkable/crosslinked proppant carrier fluid consistent with the present disclosure comprises an aqueous suspension of guar and a crosslinking agent that consists of approximately 10-20% hydroboracite, approximately 1-12% borax, and approximately 1-12% glycerol in water. This crosslinkable/crosslinked proppant carrier fluid may further comprise up to 1% canola oil and/or up to 1% xanthan present in the crosslinking agent.

The presently disclosed composition is further suited for use in methods of balancing and mixing proppant carrier fluids such that the timing of the crosslinking reaction is customized for the timing of the mixing and pumping process that delivers the crosslinkable/crosslinked proppant fluid to the fractures in a wellbore. One method of crosslinking a proppant carrier fluid consistent with the present disclosure comprises mixing the presently disclosed crosslinking composition with an aqueous suspension of guar in a just-in-time fashion as the proppant carrier fluid is introduced into a wellbore. The balance between the amount of hydroboracite and the amount of borax in the crosslinking composition can delay the attainment of maximum viscosity in the proppant solution 0-120 minutes after the crosslinking composition is mixed with the aqueous suspension of guar, depending on the desired timeframe for pumping and delivery of the fluid to the fracture in the wellbore. A preferred delay is typically up to about 40 minutes.

As such, the presently disclosed composition provides for a novel method of optimizing a delay with which a crosslinkable proppant fluid reaches a desired viscosity. That novel method involves adjusting the balance between the amount of hydroboracite and the amount of borax in the crosslinking composition according to the respective rates of borate ion release in hydroboracite and borax such that the delay corresponds to the expected time delay between mixing the crosslinking composition with the guar-based crosslinkable substrate and delivering the resulting crosslinkable proppant fluid to the wellbore fracture.

It should be noted that because the presently disclosed composition crosslinks a crosslinkable substrate such (as guar-based suspensions) gradually, or in a delayed fashion, the proppant fluid that results from mixing the crosslinking composition with the substrate can be described as both crosslinkable and crosslinked at most times during the processes described herein. At all times after the crosslinking reaction begins (which is virtually instantly upon mixing the crosslinking composition with the guar-based fluid substrate), the proppant fluid is crosslinked to some extent. At all times before the crosslinking reaction has ceased (which may be indefinitely, may continue to the point of over-crosslinking, or may be until a crosslink breaker is employed), the proppant fluid is crosslinkable to some extent. As such, the proppant fluid is referred to as crosslinkable, or crosslinked, or both interchangeably, in different instances throughout the present disclosure, depending on the context. Such descriptions are not intended to limit the proppant fluid or other formulations containing the presently described crosslinking agent to a particular state of progress with respect to the crosslinking reaction.

It should also be noted that many of the formulations described herein refer to specific ingredients that are exemplary or preferential, for example canola oil, glycerin, and xanthan. One of skill in the art would appreciate that there are countless oils, polyols, and rheology modifiers that are equivalent to the specific ingredients recited and that could be substituted as indicated in the detailed descriptions that follow.

DETAILED DESCRIPTION

The present composition is a crosslinking agent for use in crosslinking a guar-based proppant fluid. The present composition is designed to crosslink guar at a controlled rate, and is particularly suited to applications where the crosslinking agent and the guar-based proppant fluid are mixed on-site at the well formation shortly before the mixture is introduced into the hydraulic fracture. The crosslinking rate of the fluid mixture can thus be customized according to how much time is expected to elapse between when the crosslinking agent and the proppant fluid are mixed, and when the resulting mixture arrives at its intended destination within the hydraulic fracture. An objective of the present composition is therefore to maintain a relatively lower viscosity in the proppant during the earlier stages of the proppant delivery, in order to minimize the friction pressure associated with pumping a viscous fluid into a well formation, while maximizing the benefits of a fully-crosslinked and therefore relatively highly viscous fluid at the later stages of proppant delivery, when the viscosity of the fluid accommodates increased proppant suspension and reduced fluid loss within the fractures.

The present composition comprises water, hydroboracite, and borax. Hydroboracite is a compound that releases borate ions relatively slowly when suspended in aqueous solutions such as proppant fluids under the conditions typically associated with fracking formations. Borax is a compound that releases borate ions relatively quickly when suspended in aqueous solutions like proppant fluids under the conditions typically associated with fracking formations. By customizing the balance between the amount of borax and the amount of hydroboracite in the present composition, one of skill in the art can customize the resulting crosslinking reaction to fit the needs of any particular hydraulic fracturing operation. The inventors have determined that many hydraulic fracturing systems will be desirably served by providing approximately equal amounts of borax and hydroboracite in the present composition.

Alternate embodiments that deviate from this balance include differing the relative amounts of hydroboracite or borax, or including other known sources of borate ions that have different rates of borate ion release. For instance, each of the borate compounds ulexite, colemanite, probertite, nobleite, gowerite, frolovite, meyerhofferite, inyoite, priceite, tertschite, ginorite, and inderborite release borate ions at different rates. By accounting for the rate of ion release of the source of the borate ion, one of skill in the art could optimize a reaction rate using the concepts and methods disclosed herein to mix and balance different borate ion sources to support a desired reaction speed. The inventors have found that hydroboracite balanced with borax is one way to provide a well-timed crosslinking reaction for most on-the-fly well delivery applications.

In preferred embodiments, the present composition further comprises canola oil (or a similar lightweight oil), xanthan (or a similar thickening agent), and/or glycerol (or a similar polyol). Canola oil improves the dispersion of the hydroboracite powder in the aqueous diluent. Xanthan slightly increases the viscosity of the present composition (prior to mixing it with a guar-based proppant fluid) which helps to suspend the hydroboracite. Glycerol also modifies the viscosity of the present composition and enhances the performance of the present composition (and any proppant fluid into which it is mixed) at temperatures that are on the lower end of what would be expected in hydraulic fracturing environments.

In one preferred embodiment, the present composition consists of:

| | |
|---|---|
| water | 58.36% |
| hydroboracite | 11.37% |
| borax | 11.37% |
| canola oil | 0.13% |
| xanthan | 0.16% |
| glycerol (99%) | 18.61% |

This embodiment typically provides a cross-link delay of 1 to 5 minutes in guar gels depending on the temperature conditions of the environment in which it is used. In general, carrier fluid pH effects delay time, and modification of the pH of the carrier fluid provides yet another way to control the crosslink time. The pH of the carrier fluid also influences the stability of the gel at the higher end of the temperature range.

Guar gels crosslinked with the present composition are stable from 80° F. to 325° F. The 1 to 5 minute delay associated with the embodiment detailed above occurs at a pH of about 9 to 12. This embodiment provides a stable, aqueous-based, delayed borate crosslinker that yields high quality viscous guar gels upon delivery. One advantage of this embodiment is that it provides a stable, aqueous-based, delayed borate crosslinker without the use of ulexite, colemanite, or other sources of borate ions, and without the need for crosslink modifying agents or other external means for regulating the crosslink reaction. By avoiding the use of boron sources such as ulexite, and avoiding the need for crosslink modifying or regulating agents, this embodiment of the present composition provides increased delay capabilities, increased customization of reaction rate, simplified customization calculations, and lower cost.

The present composition is well-suited for uses in which it is mixed with the proppant carrier fluid continuously and delivered to the well formation on the fly during the treatment at 1-3 GPT (L/m3). On-the-fly delivery involves mixing the proppant carrier fluid and the crosslinking composition on site and pumping the resulting fluid into the well formation in a just-in-time or continuous fashion, as opposed to mixing the proppant carrier and crosslinking composition off site or in advance and storing or transporting the resulting fluid before pumping it into the wellbore.

One of skill in the art will fully appreciate how to determine the optimum concentration of the crosslinking composition within the proppant fluid to suit the desired application. The present composition can also be used with gel breakers. One of skill in the art will appreciate how to determine the optimal gel breaker concentration and identify the type of gel breaker to use for the desired fluid properties.

Preferred embodiments of the present composition have a specific gravity at 68° F. of about 1.11-1.16. Preferred embodiments have a freezing point of about 11° F.

Additional exemplary embodiments, and their respective viscosities are provided in the following examples.

EXAMPLE 1

The table below shows the formulation (first table) and corresponding viscosity delay at 160° F. (second table) for example embodiments 1-6. Measurements for embodiment 1 were taken using a F 50 Unit 2 rheometer, and measurements for embodiments 2-6 were taken using an F 50 Unit 1 rheometer.

Formulation:

|   | Water | HB | Borax | Glycerol | x-Linker loading, gpt | CrossLink pH |
|---|---|---|---|---|---|---|
| 1 | 58.36% | 11.37% | 11.37% | 18.61% | 1 | 11.01 |
| 2 | 67.34% | 11.37% | 11.37% | 9.63% | 1.5 | 11.09 |
| 3 | 71.82% | 15.00% | 7.74% | 5.16% | 1.5 | 10.85 |
| 4 | 74.37% | 13.82% | 6.91% | 4.61% | 1.5 | 11.01 |
| 5 | 78.08% | 17.08% | 4.55% | 0.00% | 1 | 11.3 |
| 6 | 58.36% | 19.37% | 0.00% | 18.61% | 1.5 | 11.26 |

Viscosity (in cP) over Time (in Minutes):

|   | 1.5 | 2 | 2.5 | 3 | 3.5 | 4 | 5 | 10 | 20 | 25 | 30 | 35 | 40 | 50 | 60 | 90 | 120 |
|---|---|---|---|---|---|---|---|---|---|---|---|---|---|---|---|---|---|
| 1 | 71 | 80 | 100 | 110 | 131 | 151 | 186 | 201 | 178 | 171 | 182 | 199 | 218 | 232 | 240 | 249 | 257 |
| 2 | 45 | 119 | 155 | 164 | 201 | 206 | 196 | 209 | 301 | 313 | 318 | 330 | 331 | 342 | 342 | 345 | 340 |
| 3 | 10 | 14 | 30 | 50 | 72 | 88 | 138 | 150 | 213 | 240 | 250 | 267 | 289 | 310 | 318 | 338 | 341 |
| 4 | 24 | 27 | 36 | 53 | 70 | 93 | 134 | 164 | 211 | 230 | 250 | 266 | 280 | 295 | 300 | 312 | 342 |
| 5 | 10 | 9 | 8 | 9 | 8 | 7 | 6 | 6 | Fail | | | | | | | | |
| 6 | 54 | 51 | 51 | 51 | 50 | 50 | 50 | 49 | 48 | 50 | 53 | 61 | 63 | 102 | 150 | 196 | 212 |

EXAMPLE 2

The table below shows the formulation (first table) and corresponding viscosity delay at 200° F. (second table) for example embodiments 7-11. Measurements for embodiments 7-11 were taken using an F50 Unit 2 rheometer.

Formulation:

|   | Water | HB | Borax | Glycerol | x-Linker loading, gpt | CrossLink pH |
|---|---|---|---|---|---|---|
| 7 | 58.36% | 11.37% | 11.37% | 18.61% | 1.5 | 11.26 |
| 8 | 67.34% | 11.37% | 11.37% | 9.63% | 1.5 | 11.23 |
| 9 | 71.82% | 15.00% | 7.74% | 5.16% | 1.5 | 11.32 |
| 10 | 74.37% | 13.82% | 6.91% | 4.61% | 1.5 | 11.4 |
| 11 | 78.08% | 17.08% | 4.55% | 0.00% | 1.5 | 11.5 |

Viscosity (in cP) over Time (in Minutes):

| | 1.5 | 2 | 2.5 | 3 | 3.5 | 4 | 5 | 10 | 20 | 25 | 30 | 35 | 40 | 50 | 60 | 90 | 120 |
|---|---|---|---|---|---|---|---|---|---|---|---|---|---|---|---|---|---|
| 7 | 77 | 95 | 126 | 175 | 202 | 237 | 234 | 250 | 255 | 267 | 260 | 264 | 260 | 262 | 259 | 232 | 204 |
| 8 | 30 | 35 | 61 | 106 | 137 | 172 | 191 | 220 | 181 | 191 | 178 | 173 | 176 | 174 | 170 | 154 | 134 |
| 9 | 25 | 23 | 24 | 30 | 45 | 67 | 100 | 112 | 128 | 137 | 123 | 121 | 130 | 133 | 132 | 128 | 119 |
| 10 | 17 | 27 | 40 | 53 | 68 | 85 | 110 | 84 | 83 | 89 | 65 | 76 | 94 | 97 | 97 | 77 | 59 |
| 11 | 24 | 23 | 21 | 20 | 20 | 21 | 20 | 20 | Fail | | | | | | | | |

EXAMPLE 3

In an alternate embodiment, the present composition further comprises NaOH. NaOH modifies the pH under which the crosslinking reaction takes place, thus moderating the rate at which hydroboracite releases borate ions. The rate at which hydroboracite releases borate ions, in turn, further influences the rate at which the crosslinking reaction progresses.

Formulation 12:

| Component | State | Sp. Gravity | Lab Blend gms | Lab Blend ml | Lab Blend lbs | % by Gallon | Volume gals | Volume lbs. |
|---|---|---|---|---|---|---|---|---|
| Water | Liquid | 1 | 45.58% | 2161.54 | 4.7653065 | 57% | 0.570930541 | 4.7653065 |
| Hydroboracite | Solid | 2.2 | 11.05% | 238.19 | 1.1552575 | 6% | 0.062914182 | 1.155257499 |
| Borax | Liquid | 1.73 | 11.41% | 312.77 | 1.19289485 | 8% | 0.08261302 | 1.192894848 |
| Canola Oil | Liquid | 0.916 | 0.13% | 6.73 | 0.01359126 | 0% | 0.001777693 | 0.013591265 |
| Xanthan | Solid | 1.49 | 0.16% | 5.09 | 0.01672771 | 0% | 0.001345063 | 0.01672771 |
| Glycerol 99% | Liquid | 1.26 | 11.84% | 445.63 | 1.23785057 | 12% | 0.117703699 | 1.23785057 |
| NaOH 50% | Liquid | 1.529 | 19.83% | 615.04 | 2.07319061 | 16% | 0.162451671 | 2.073190608 |
| Total | | | 100.00% | 3785.00 | 10.4456077 | 100% | 0.999735869 | 10.44560771 |
| Theoretical Specific Gravity | | | | | 1.25292098 | | | |
| Desired Volume in gallons: | | | | | 1 | | | |

EXAMPLE 4

Formulation 1 at 200° F. Measured with Fann 50 Unit 2 Rheometer in DI Water, with Polymer Loading 20 ppt, 1.5 gpt Formulation 1, Poolystim CS 1 gpt Formulation 13: Formulation 1 without Canola Oil

| Linear Gel Visc (cP) | Linear Gel pH | pH Adjust 20 (gpt) | CrossLink pH | Viscosity (in cP) over time | | | | | | | |
|---|---|---|---|---|---|---|---|---|---|---|---|
| | | | | 1 min | 1.5 min | 2 min | 2.5 min | 3 min | 3.5 min | 4 min | 5 min | 10 min |
| 15 | 7.6 | 1 | 11.6 | 52 | 69 | 83 | 90 | 87 | 87 | 84 | 85 | 121 |
| 15 | 7.6 | 1 | 11.6 | 32 | 38 | 50 | 56 | 69 | 70 | 77 | 74 | 104 |
| 15 | 7.6 | 0.5 | 10.86 | 175 | 163 | 155 | 146 | 136 | 122 | 112 | 106 | 88 |

| 20 min | 25 min | 30 min | 35 min | 40 min | 50 min | 60 min | 90 min | 120 min |
|---|---|---|---|---|---|---|---|---|
| 79 | 100 | 95 | 98 | 95 | 97 | | | |
| 76 | 95 | 83 | 80 | 86 | 83 | | | |
| 34 | 29 | 22 | | | | | | |

As Compared to Formulation 1:

| Linear Gel Visc (cP) | Linear Gel pH | PfP pH Adjust 20 (gpt) | CrossLink pH | Viscosity (in cP) over time | | | | | | |
|---|---|---|---|---|---|---|---|---|---|---|
| | | | | 1 min | 1.5 min | 2 min | 2.5 min | 3 min | 3.5 min | 4 min | 5 min |
| 15.4 | 7.1 | 1 | 11.26 | 70 | 77 | 95 | 126 | 175 | 202 | 237 | 234 |
| 15.4 | 7.1 | 1 | 11.3 | 68 | 70 | 80 | 100 | 140 | 149 | 190 | 210 |
| 15.4 | 7.1 | 1 | 11.08 | 67 | 69 | 93 | 100 | 100 | 112 | 123 | 199 |

| 10 min | 20 min | 25 min | 30 min | 35 min | 40 min | 50 min | 60 min | 90 min | 120 min |
|---|---|---|---|---|---|---|---|---|---|
| 250 | 255 | 267 | 260 | 264 | 260 | 262 | 259 | 232 | 204 |
| 167 | 230 | 265 | 261 | 242 | 255 | 266 | 260 | 260 | 202 |
| 281 | 293 | 296 | 258 | 261 | 282 | 274 | 270 | 250 | 216 |

EXAMPLE 5

| Condition | (° F.) | Slurry Loading (gpt) | Linear Gel Visc (cP) | Linear Gel pH | Polystim CS (gpt) | PfP pH Adjust 20 (gpt) | Polystim HTS (gpt) | Formulation | Cross-Linker loading (gpt) | Cross-Link pH |
|---|---|---|---|---|---|---|---|---|---|---|
| A | 270 | 35 | 37 | 7.2 | 1 | 2.8 | 4 | 1 | 2.5 | 12.21 |
| B | 280 | 40 | 46 | 7.4 | 1 | 2.8 | 4 | 1 | 2.5 | 12.01 |
| C | 300 | 40 | 46 | 7.5 | 1 | 3 | 4 | 1 | 3 | 12.1 |
| D | 300 | 40 | 46 | 7.5 | 1 | 3.75 | 5 | 1 | 3 | 12.1 |

Crosslinked Gel Viscosity in cP over Time:

| Condition | 1.5 min | 2 min | 2.5 min | 3 min | 3.5 min | 4 min | 5 min | 10 min |
|---|---|---|---|---|---|---|---|---|
| A | 136 | 195 | 387 | 496 | 560 | 581 | 541 | 548 |
| B | 231 | 407 | 740 | 880 | 862 | 719 | 674 | 781 |
| C | 203 | 244 | 392 | 589 | 714 | 782 | 751 | 982 |
| D | 216 | 393 | 674 | 792 | 797 | 752 | 586 | 781 |

| Condition | 20 min | 30 min | 35 min | 40 min | 50 min | 60 min | 90 min | 120 min |
|---|---|---|---|---|---|---|---|---|
| A | 257 | 379 | 369 | 404 | 368 | 360 | 272 | 204 |
| B | 659 | 946 | 827 | 826 | 763 | 648 | 479 | 274 |
| C | 342 | 179 | 175 | 160 | 132 | 111 | 84 | 72 |
| D | 320 | 170 | 362 | 206 | 156 | 145 | 86 | 70 |

EXAMPLE 6

Formulation 1

Table Top Crosslinking at Various pH Gel
Formulation: 20 ppt PolyFrac Plus M-4.0+1 gpt
PolyStim (CS)+See table below Linear Gel
Viscosity: 15.4 cP->Gel pH: 7.20

| x-linked gel pH | 9.25 | 9.54 | 9.92 | 10.50 | 11.2 |
|---|---|---|---|---|---|
| pH Adjust 20 | 0.12 gpt | 0.16 gpt | 0.2 gpt | 0.4 gpt | 0.8 gpt |
| Gel pH | 10.3 | 10.5 | 10.7 | 11.05 | 11.5 |
| Vortex Closure | 7 sec | 11 sec | 11 sec | 24 sec | 1 min 28 sec |
| Crown | 10 sec | 14 sec | 15 sec | 29 sec | 1 min 50 sec |
| Lip | Instant | Instant | Instant | 41 sec | 2 min 11 sec |

EXAMPLE 7

Crosslinking Formulations 1 and 6 at Varying Temperatures

| Test Temp (° F.) | Formu-lation | pH Adjust 20 (gpt) | Crosslinker (gpt) | Crosslink pH | 1.5 min Viscocity (cP) | 2 min Viscocity (cP) | 2.5 min Viscocity (cP) | 3 min Viscocity (cP) | 4 min Viscocity (cP) |
|---|---|---|---|---|---|---|---|---|---|
| 200 | 1 | 0.6 | 2 | 10.52 | 225 | 240 | 239 | 236 | 213 |
| 160 F. | 1 | 0.6 | 1.5 | 11.09 | 45 | 119 | 155 | 164 | 206 |
| 200 | 1 | 1 | 1.5 | 11.26 | 77 | 95 | 126 | 175 | 237 |
| 160 F. | 1 | 1 | 1 | 11.44 | 39 | 49 | 62 | 71 | 104 |
| 160 | 1 | 1 | 1 | 11.03 | 53 | 50 | 51 | 57 | 81 |
| 160 | 6 | 1 | 1.5 | 11.26 | 54 | 51 | 51 | 51 | 50 |
| 160 | 6 | 0.16 | 1.5 | 9.7 | 54 | 51 | 51 | 51 | 50 |

| Formu-lation | Test Temp (° F.) | 5 min Viscocity (cP) | 10 min Viscocity (cP) | 20 min Viscocity (cP) | 30 min Viscocity (cP) | 35 min Viscocity (cP) | 40 min Viscocity (cP) | 60 min Viscocity (cP) | 90 min Viscocity (cP) | 120 min Viscocity (cP) |
|---|---|---|---|---|---|---|---|---|---|---|
| 1 | 200 | 187 | 278 | 285 | 225 | 241 | 246 | 236 | 212 | 211 |
| 1 | 160 F. | 196 | 209 | 301 | 318 | 331 | 342 | 342 | 345 | 340 |
| 1 | 200 | 234 | 250 | 255 | 260 | 264 | 260 | 259 | 232 | 204 |
| 1 | 160 F. | 130 | 164 | 213 | 246 | 251 | 262 | 264 | 273 | 275 |
| 1 | 160 | 110 | 173 | 210 | 235 | 220 | 217 | 231 | 243 | 245 |
| 6 | 160 | 50 | 50 | 48 | 61 | 63 | 102 | 150 | 196 | 212 |
| 6 | 160 | 49 | 50 | 48 | 53 | 61 | 75 | 125 | 216 | 210 |

EXAMPLE 8

Gel Formulation: PolyFrac Plus+1 gpt PolyStim (CS)+2.0 gpt Hydroboracite x-linker+See Table Below Linear Gel pH: 7.20

| | Cross-linked Gel Viscosity, cP @ 100 sec-1 over time in minutes | | | | | | | | | | | | | |
|---|---|---|---|---|---|---|---|---|---|---|---|---|---|---|
| Condition | 1.5 | 2.0 | 2.5 | 3.0 | 3.5 | 4.0 | 5.0 | 10 | 20 | 30 | 40 | 50 | 60 | 90 | 120 |
| E | 96 | 120 | 129 | 140 | 147 | 166 | 200 | 241 | 212 | 178 | 145 | 128 | 130 | 133 | 103 |
| F | 594 | 601 | 605 | 617 | 604 | 583 | 556 | 469 | 310 | 213 | 148 | 108 | 126 | 146 | 147 |
| G | 45 | 119 | 155 | 164 | 201 | 206 | 196 | 209 | 301 | 318 | 331 | 342 | 342 | 345 | 340 |
| H | 39 | 49 | 62 | 71 | 90 | 104 | 130 | 164 | 213 | 246 | 251 | 262 | 264 | 273 | 275 |
| I | 225 | 240 | 239 | 236 | 223 | 213 | 187 | 278 | 285 | 225 | 241 | 246 | 236 | 212 | 211 |

| Condition | Test Temp (° F.) | Gel loading | Hydration Visc, cP | pH Adjust20, gpt | HTS, gpt | Formulation | X-linker Loading, gpt | X-linked gel pH |
|---|---|---|---|---|---|---|---|---|
| E | 80 F. | 20# | 15.4 | 0.4 | 0 | 1 | 1.5 | 10.61 |
| F | 80 F. | 20# | 15.4 | 0.6 | 0 | 1 | 2.0 | 10.2 |
| G | 160 F. | 20# | 15.2 | 0.6 | 0 | 1 | 1.5 | 11.09 |
| H | 160 F. | 20# | 15.2 | 1 | 0 | 1 | 1.0 | 11.44 |
| I | 200 | 20# | 15.4 | 0.6 | 0 | 1 | 2.0 | 10.52 |

EXAMPLE 9

Formulations 1-12 with Canola Oil and Xanthan

| Form. # | Water | 50% NaOH % | Glycerol | HB | Borax | Canola Oil % | Xanthan % | Total |
|---|---|---|---|---|---|---|---|---|
| 1 | 58.36% | | 18.61% | 11.37% | 11.37% | 0.13% | 0.16% | 100.00% |
| 2 | 67.34% | | 9.63% | 11.37% | 11.37% | 0.13% | 0.16% | 100.00% |
| 3 | 71.82% | | 5.16% | 15.00% | 7.74% | 0.13% | 0.16% | 100.01% |
| 4 | 74.37% | | 4.61% | 13.82% | 6.91% | 0.13% | 0.16% | 100.00% |
| 5 | 78.08% | | 0.00% | 17.08% | 4.55% | 0.13% | 0.16% | 100.00% |
| 6 | 58.36% | | 18.61% | 22.74% | 0.00% | 0.13% | 0.16% | 100.00% |
| 7 | 29.72% | 17.42% | 30.84% | 22.02% | | | | 100.00% |
| 8 | 32.56% | 19.83% | 35.09% | 12.52% | | | | 100.00% |
| 9 | 50.10% | 19.83% | 17.55% | 12.52% | | | | 100.00% |
| 10 | 65.18% | | 11.80% | 11.37% | 11.37% | 0.13% | 0.16% | 100.01% |
| 11 | 45.42% | 19.76% | 11.80% | 11.37% | 11.37% | 0.13% | 0.16% | 100.01% |
| 12 | 52.03% | 17.97% | 10.73% | 19.03% | | 0.12% | 0.12% | 100.00% |

| | Water % | 50% NaOH % | Glycerol, % | HB % | Borax % | Canola Oil, % | Xanthan % |
|---|---|---|---|---|---|---|---|
| All formulation Range | 29-79% | 17-20% | 0-36% | 10-23% | 0-12% | 0-0.13% | 0-0.16% |

The embodiments disclosed above are various species of the larger genus that is the presently disclosed composition, and methods of making and using that composition that collectively constitute the present disclosure. From this disclosure one of skill in the art can appreciate the relationships among borate ion sources, crosslink reactions, time, an temperature and will be able to readily extrapolate other desired reaction times and the borate ion source balances for achieving those reaction times through routine optimization. One of skill in the art would readily appreciate that further optimization of the formulation of the presently disclosed composition, the proppant fluid into which it is mixed, and the fracking systems and methods in which it is used can vary without departing from the scope of the present disclosure.

What is claimed is:

1. A crosslinking composition comprising:
   between 10% and 12% of hydroboracite;
   between 1% and 12% of borax,
   between 0.1% and 1% of a lightweight oil,
   between 0.15% and 1% of a thickening agent, and
   between 15% and 20% a polyol,
   wherein the amount of hydroboracite and the amount of borax may be adjusted to achieve a controlled crosslinking rate.

2. The crosslinking composition of claim 1, further comprising:
   water, and
   an aqueous NaOH solution in an amount sufficient to adjust a pH of the composition to a pH between about 9 and about 12.

3. The crosslinking composition of claim 1, wherein:
   the lightweight oil comprises canola oil,
   the thickening agent comprises xanthan, and
   the polyol comprises glycerol.

4. The crosslinking composition of claim 3, wherein the canola oil is present in an amount between 0.1% and 0.15%.

5. The crosslinking composition of claim 1, wherein the mixture comprises approximately equal parts of hydroboracite and borax.

6. The crosslinking composition of claim 5, the approximately equal parts of hydroboracite and borax comprise between 10% and 12% of hydroboracite and between 10% and 12% of borax.

7. A composition comprising:
   a crosslinkable substrate,
   a crosslinking composition comprises:
      a mixture of hydroboracite and borax,
      a lightweight oil,
      a thickening agent, and
      a polyol,
      wherein the amount of hydroboracite and the amount of borax may be adjusted to achieve a controlled crosslinking rate.

8. The composition of claim 7, wherein the crosslinking composition comprises:
   the mixtures comprises between 10% and 12% of hydroboracite and between 1% and 12% of borax;
   between 0.1% and 1% of the lightweight oil;
   between 0.15% and 1% of the thickening agent; and
   between 15% and 20% of the polyol.

9. The composition of claim 7, wherein:
   the lightweight oil comprises canola oil;
   the thickening agent comprises xanthan; and
   the polyol comprises glycerol.

10. The crosslinking composition of claim 9, wherein the canola oil is present in an amount between 0.1% and 0.15%.

11. The composition of claim 7, wherein the crosslinkable substrate guar-based substrate including guar and guar derivatives.

12. The composition of claim 7, further comprising:
    water, and
    an amount of a NaOH solution sufficient to adjust a pH of the composition to a pH between about pH 9 and about pH 12.

13. The composition of claim 7, wherein the mixture comprises approximately equal parts of hydroboracite and borax.

14. The composition of claim 13, the approximately equal parts of hydroboracite and borax comprise between 10% and 12% of hydroboracite and between 10% and 12% of borax.

15. A fracturing fluid composition comprising:
a crosslinking composition comprising:
  a mixture of hydroboracite and borax,
  a lightweight oil,
  a thickening agent, and
  a polyol;
a crosslinkable substrate; and
a proppant,
wherein an amount of hydroboracite and an amount of borax may be adjusted to achieve a desire crosslinking profile.

16. The fracturing fluid composition of claim 15, further comprising:
water, and
an amount of a NaOH solution sufficient to adjust a pH of the composition to a pH between about pH 9 and about pH 12.

17. The fracturing fluid composition of claim 15, wherein the crosslinking composition comprises:
the mixtures comprises between 10% and 12% of hydroboracite and between 1% and 12% of borax;
between 0.1% and 1% of the lightweight oil;
between 0.15% and 1% of the thickening agent; and
between 15% and 20% of the polyol.

18. The fracturing fluid composition of claim 15, wherein:
the lightweight oil comprises canola oil;
the thickening agent comprises xanthan; and
the polyol comprises glycerol.

19. The crosslinking composition of claim 18, wherein the canola oil is present in an amount between 0.1% and 0.15%.

20. The fracturing fluid composition of claim 15, wherein the crosslinkable substrate guar-based substrate including guar and guar derivatives.

21. The fracturing fluid composition of claim 15, wherein the mixture comprises approximately equal parts of hydroboracite and borax.

22. The fracturing fluid composition of claim 21, the approximately equal parts of hydroboracite and borax comprise between 10% and 12% of hydroboracite and between 10% and 12% of borax.

* * * * *